US008799951B1

(12) United States Patent
Hamilton et al.

(10) Patent No.: US 8,799,951 B1
(45) Date of Patent: Aug. 5, 2014

(54) SYNCHRONIZING AN ADVERTISEMENT STREAM WITH A VIDEO SOURCE

(75) Inventors: Jeffrey William Hamilton, Austin, TX (US); Dmitri Plotnikov, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 89 days.

(21) Appl. No.: 13/250,912

(22) Filed: Sep. 30, 2011

Related U.S. Application Data

(60) Provisional application No. 61/449,826, filed on Mar. 7, 2011.

(51) Int. Cl.
*H04N 5/445* (2011.01)

(52) U.S. Cl.
USPC ........ 725/43; 725/9; 725/12; 725/19; 725/34; 725/40; 725/41; 725/42

(58) Field of Classification Search
USPC .................................................. 725/9, 12, 18
See application file for complete search history.

(56) References Cited

U.S. PATENT DOCUMENTS

| 7,672,937 | B2 | 3/2010 | Madhavan et al. |
| 7,706,740 | B2 | 4/2010 | Collins et al. |
| 7,712,125 | B2 * | 5/2010 | Herigstad et al. ............. 725/141 |
| 2004/0122746 | A1 | 6/2004 | Charlier et al. |
| 2004/0237114 | A1 * | 11/2004 | Drazin .......................... 725/105 |
| 2006/0212507 | A1 * | 9/2006 | Clark et al. ................... 709/200 |
| 2006/0288374 | A1 * | 12/2006 | Ferris et al. ..................... 725/62 |
| 2007/0016918 | A1 | 1/2007 | Alcorn et al. |
| 2008/0004957 | A1 | 1/2008 | Hildreth et al. |
| 2008/0089551 | A1 | 4/2008 | Heather et al. |
| 2008/0262929 | A1 | 10/2008 | Behr |
| 2009/0018911 | A1 | 1/2009 | An Chang et al. |
| 2009/0063263 | A1 | 3/2009 | Krantz et al. |
| 2009/0193453 | A1 | 7/2009 | Cansler et al. |
| 2009/0204488 | A1 | 8/2009 | Leviev-Cohen |
| 2009/0254446 | A1 | 10/2009 | Chernyak |
| 2009/0276345 | A1 * | 11/2009 | Hughes ........................... 705/34 |
| 2010/0281108 | A1 * | 11/2010 | Cohen ........................... 709/203 |
| 2011/0063503 | A1 | 3/2011 | Brand et al. |
| 2011/0078729 | A1 | 3/2011 | LaJoie et al. |
| 2011/0093876 | A1 * | 4/2011 | Belz et al. ....................... 725/12 |
| 2011/0099197 | A1 | 4/2011 | Wang et al. |
| 2011/0244784 | A1 | 10/2011 | Wang |

OTHER PUBLICATIONS

U.S. Appl. No. 13/251,138, by Hamilton et al., filed Sep. 30, 2011.

(Continued)

*Primary Examiner* — Jun Fei Zhong
(74) *Attorney, Agent, or Firm* — Shumaker & Sieffert, P.A.

(57) ABSTRACT

In general, embodiments of the present disclosure are directed to a system for synchronizing an advertisement stream on a mobile device with the contents of a video source that includes audio data. In one example, the method includes receiving a mobile device identifier of a mobile device of the at least one user; receiving a television event identifier from the television platform, wherein the television event identifier is associated with a television event included in the television program content; selecting marketing information associated with the television event based on the television event identifier, wherein the television event identifier and the mobile device identifier are usable by the network server to determine that the television program content is provided to the at least one user associated with the mobile device; and transmitting a message that includes the marketing information from the network server to the mobile device.

13 Claims, 10 Drawing Sheets

(56) References Cited

OTHER PUBLICATIONS

Buy products on the move with QVC Mobile, accessed Aug. 12, 2010, found at http://www.qvcuk.com/ukqic/qvcapp.aspx/app.html/params.file.mobile_featoct06,html?cm_re=Footer-_-QVCEverywhere-_-Mobile, 2 pp.

"Concepting: NFC Enabled TV & Radio for Mobile Advertising," My Mobile Concepts, NFC, found at http://www.mobileinc.co.uk/2009/09/concepting-nfc-enabled-tv-radio-for-mobile-advertising/, dated Sep. 29, 2009, 2 pp.

"Google Domination, First Android TV on the Way," found at http://www.mobileinc.co.uk/2010/04/google-domination-first-android-tv-on-the-way/, dated Apr. 5, 2010, 3 pp.

"HSN debuts mobile commerce iPhone app," found at http://www.mobilemarketer.com/cms/news/commerce/3969.html, dated Aug. 19, 2009, 4 pp.

QVC Mobile Services, found at 6. http://www.qvc.com/cgen/render.aspx?qp=promo|mobileservices&rewrite=no&cookie=set, accessed Aug. 12, 2010, 1 p.

Office Action from U.S. Appl. No. 13/251,138, dated Dec. 21, 2011, 24 pp.

Response to Office Action dated Dec. 21, 2011, from U.S. Appl. No. 13/251,138, filed Mar. 21, 2012, 13 pp.

HSN Mobile home page, found at http://www.hsn.com/hsn-everywhere-mobile_at-5033_xa.aspx?&nolnav=1&cm_sp=Global*BN*HSNmobile, accessed Aug. 12, 2010, 1 p.

Lim et al., "A target advertisement system based on TV viewer's profile reasoning," Multimedia Tools and Applications vol. 36, Nos. 1-2, pp. 11-35, found at http://www.springerlink.com/content/f1q006658625h640/ Abstract Only.

Response to Office Action dated Jul. 24, 2012, from U.S. Appl. No. 13/251,138, filed Oct. 24, 2012, 13 pp.

Office Action from U.S. Appl. No. 13/251,138, dated Jul. 24, 2012, 29 pp.

Final Office Action from U.S. Appl. No. 13/251,138, dated Feb. 25, 2013, 25 pp.

* cited by examiner

US 8,799,951 B1

SYNCHRONIZING AN ADVERTISEMENT STREAM WITH A VIDEO SOURCE

RELATED APPLICATIONS

This application claims the benefit of U.S. Provisional Application No. 61/449,826, filed Mar. 7, 2011, the entire content of which is incorporated herein in its entirety.

TECHNICAL FIELD

The disclosure relates to systems for promoting goods or services on a mobile device.

BACKGROUND

A user may interact with applications executing on a computing device (e.g., mobile phone, tablet computer, smart phone, or the like). For instance, a user may install, view, or delete an application on a computing device.

A user may use a mobile device (e.g., mobile phone, tablet computer, smart phone, or the like) in proximity to video broadcast. For instance, a user may watch a television broadcast while interacting with a mobile device.

SUMMARY

In one example, the method includes receiving, by a network server and from a television platform that manages television program content provided to at least one user, a mobile device identifier of a mobile device associated with the at least one user; receiving, by the network server, a television event identifier from the television platform, wherein the television event identifier is associated with a television event included in the television program content; selecting, by the network server, marketing information associated with the television event based on the television event identifier, wherein the television event identifier and the mobile device identifier are usable by the network server to determine that the television program content is provided to the at least one user associated with the mobile device; and transmitting, by the network server, a message that includes the marketing information from the network server to the mobile device identified by the mobile device identifier, such that the marketing information may be provided to the at least one user.

In one example, a computer-readable storage medium is encoded with instructions that cause one or more processors of a computing device to: receive, by a network server and from a television platform that manages television program content provided to at least one user, a mobile device identifier of a mobile device associated with the at least one user; receive, by the network server, a television event identifier from the television platform, wherein the television event identifier is associated with a television event included in the television program content; select, by the network server, marketing information associated with the television event based at least in part on the television event identifier, wherein the television event identifier and the mobile device identifier are usable by the network server to determine that the television program content is provided to the at least one user associated with the mobile device; and transmit, by the network server, a message that includes the marketing information from the network server to the mobile device identified by the mobile device identifier, such that the marketing information may be provided to the at least one user.

In one example, a computing device includes one or more processors; a synchronization application operable by the one or more processors to receive a mobile device identifier of a mobile device associated with at least one user, receive a television event identifier from a television platform, and transmit a message that includes marketing information from the computing device to the mobile device identified by the mobile device identifier, such that the marketing information may be provided to the at least one user; and means for selecting the marketing information based the television event identifier, wherein the television event identifier and the mobile device identifier are usable by the network server to determine that the television program content is provided to the at least one user associated with the mobile device.

DETAILED DESCRIPTION

In general, embodiments of the present disclosure are directed to a system that may be used for synchronizing an advertisement stream on a mobile device with the contents of a video source that includes audio data. Product placements have become increasingly prevalent in movies, television shows, and other forms of video programming. Often, a viewer may wish to purchase a product featured in video programming or the viewer may simply desire more information about the product. As ownership of portable, networked devices has increased, viewers have begun using such devices in physical proximity to sources of video programming. For example, a user may watch a television show and simultaneously use a tablet personal computer. Alternatively, the user may watch video programming on the portable, networked device itself. Currently, if a user wishes to purchase or learn more about a product featured in video programming, the user must engage in a manual Internet search for the product. Manual searches may present certain problems. For example, the specific product may be difficult to locate, or the viewer may forget product details. A viewer would therefore benefit from product advertisements that are synchronized with the content of video programming as described in aspects of the present disclosure.

Figure 1:
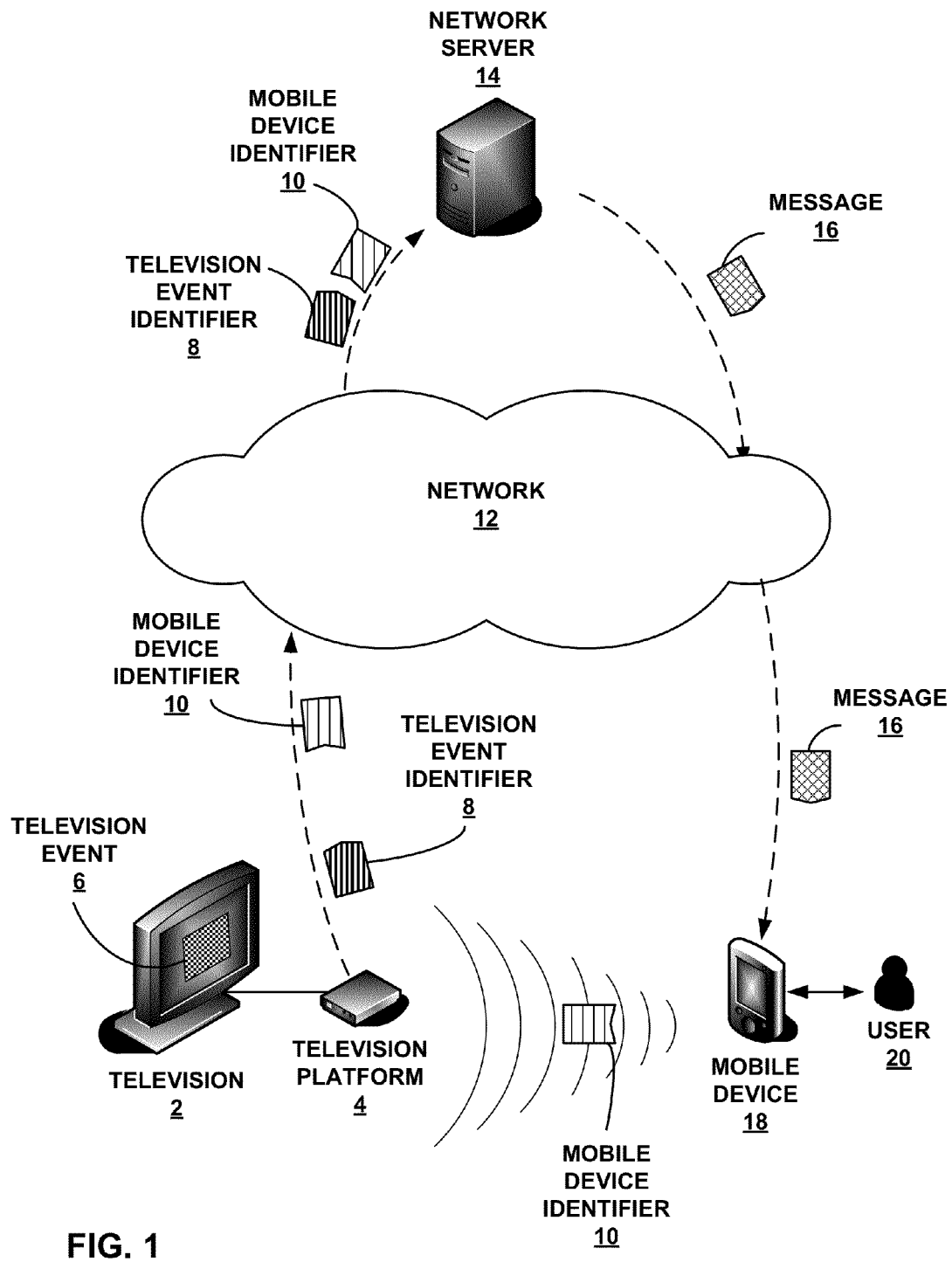
FIG. 1 is a block diagram illustrating one example of a system that may be used for transmitting marketing information associated with a television event, in accordance with one or more aspects of the present disclosure.

FIG. 1 is a block diagram illustrating one example of a system for transmitting marketing information associated with a television event 6, in accordance with one or more aspects of the present disclosure. In FIG. 1, a television 2 may in some cases be a conventional television set including a Cathode Ray Tube (CRT) or Liquid Crystal Display (LCD) and internal electronic circuits for receiving and decoding broadcast signals. Television 2 may in other examples be implemented as a mobile device 18, including a tablet computer, netbook, or smartphone. In some examples, television 2 may receive and decode signals, which may include television program content (not shown). For example, television 2 may in some examples, receive and decode radio frequency broadcast signals which include television program content that may be displayed by television 2. In other examples, television 2 may be, e.g., a computing device such as a desktop computer, laptop, tablet computer, smart phone, etc., that receives and decodes digital data. In such examples, the digital data may include television program content that may be displayed by television 2. Television program content may include audio, visual or other sensory output. For example, television program content may include a broadcast of a sports contest. The broadcast of the sports contest may include a live visual and audio reproduction of the sports contest. Other examples of television program content include movies, news broadcasts, home shopping programs, sitcoms, infomercials, commercials, and reality television programs.

Television program content may further include one or more television events, such as television event 6. Television event 6 may include any event in a video and/or audio signal. In some examples, television event 6 may include a product placement, trade symbol display, live performance, or other information included in the broadcast signal. A product placement, for example, may include displaying a product in television program content. Product placements may be coordinated in advance by a producer of television program content and a manufacturer of a particular product. For example, a producer of a movie may coordinate with an automobile manufacturer to include the automobile manufacturer's sports car in an action sequence of a movie.

In another example, a home shopping television program may include a product featured for sale. In other examples, product placements may occur spontaneously in television program content. For example, a live broadcast of a sports contest may, at various times, display sports equipment used by participants in the sports contest. The sports equipment may further include trade symbols associated with the manufacturer of the sports equipment or other product identifiers. A viewer of television program content, e.g., user 20, may potentially wish to purchase or research the sporting equipment. The trade symbols or product identifiers may provide the information necessary to locate and purchase the sporting equipment at a later time.

Television 2 may be connected to a television platform 4. Television platform 4 may include computer software and/or hardware to connect television 2, television program content, and a network 12. In some examples, television platform 4 may manage television program content displayed by television 2. For example, television platform 4 may be a Google TV™ appliance to manage television program content displayed by television 2. Network 12 may include the Internet, a wireless network, a wired network, a fiber optic network, or any other network facilitating the transmission of information between two or more devices. In some examples, television platform 4 may execute as a television peripheral external to mobile device 18. Examples of television peripherals include digital video recorders (DVR), set top boxes, or other electronic appliances. The television peripheral may be connected to television 2 by any well-known connection interface, e.g., Bluetooth®, Wi-Fi, or Universal Serial Bus (USB) ®. In another example, television platform 4 may be executed by television 2 as an integrated, internal component. In other examples, television platform 4 may execute on mobile device 18.

Television platform 4 may include software and/or hardware to enable a viewer, e.g., user 20, to interact with television program content through a user interface. In other examples, television platform 4 may process, analyze, or modify television program content displayed by television 2. For example, television platform 4 may perform processing of television program content including scanning television program content for one or more television events 6. Television platform 4 may, during processing of television program content, identify a television event 6 and create a corresponding television event identifier 8. Television event identifier 8 may include information related to television event 6. Information in television event identifier 8 may include product name, manufacturer name, and other information corresponding to television event 6, as well as information corresponding to the television program content including timestamp and channel identification information.

In one non-limiting example, a viewer, e.g., user 20, may watch television program content displayed by television 2. The television program content may be a movie including a television event 6. Television event 6 may be a product placement of a sports car in an action sequence. Television platform 4 may process the movie in the real-time as it is displayed by television 2. Television platform 4 may identify television event 6 corresponding to the sports car in the action sequence and create a television event identifier 8 including the car model, car manufacturer name, movie name, and information related to the action sequence. Television platform 4 may then transmit television event identifier 8 to another device, e.g., network server 14 using network 12.

Television platform 4 may further include hardware and/or software to detect a mobile device 18 of user 20 in physical proximity to television platform 4. For example, television platform 4 may detect mobile device 18 using Bluetooth®, Wi-Fi®, radio frequency identification (RFID)®, cellular identification, or other available identification technologies. Television platform 4 may identify mobile device 18 by a mobile device identifier 10. Mobile device identifier 10 may include information that enables television platform 4 to uniquely identify mobile device 18. For example, mobile device identifier 10 may include a cellular telephone number, Bluetooth® identifier, RFID® identifier (e.g., an electronic product code), or other unique identifier for mobile device 18. Mobile device identifier 10 may be transmitted using a data packet, signal or other information carrier. In one example, television platform 4 may listen for mobile device identifier 10 transmitted from mobile device 18.

In another example, television platform 4 may periodically broadcast a request for mobile device identifier 10 of mobile device 18 in physical proximity to television platform 4. Upon receiving mobile device identifier 10, television software platform 4 may transmit television event identifier 8 to another device using network 12, e.g., the Internet. Television platform 4 may also process, analyze, or modify mobile device identifier 10 before transmitting mobile device identifier 10 to, e.g., network server 14.

In FIG. 1, a network server 14 may comprise one or more desktop computers, mainframes, minicomputers, or other computing devices capable of executing computer instructions and storing data. Technical details of network server 14 are further discussed in the example of FIG. 2. Network server 14 may connect to network 12, e.g., the Internet, a wireless network, a wired network, or a fiber optic network. Network server 14 may execute or provide a database, which includes one or more television event identifiers 8 and marketing information. Network server 14 may execute software that operates on television event identifier 8 and marketing information. Marketing information may include product information such as price, specifications, vendors, product media, or other data related to television event 6. Marketing information may include one or more advertisements.

In one example, network server 14 may receive, using network 12, mobile device identifier 10 and television event identifier 8 from television platform 4. Network server 14 may process television event identifier 8 using a synchronization application 42 (shown in FIG. 2) to select corresponding marketing information from a database. The marketing information may be packaged in a message 16. Message 16 may in turn be sent by network server 14 to mobile device 18 using network 12. Network server 14 may send message 16 to mobile device 18 based on mobile device identifier 10. For example, network server 14 may use a cellular phone number identifying mobile device 18 to send message 16 to the appropriate mobile device 18. Mobile device 18 may receive message 16 and display marketing information from message 16 to user 20. User 20 may be the owner of mobile device 18 and a current viewer of television program content displayed by television 2.

Various aspects of the disclosure may provide, in certain instances, one or more benefits and advantages. For example, when a viewer, e.g., user 20, watches television program content while using mobile device 18 in physical proximity to television platform 4, the user may advantageously receive marketing information corresponding to the television program content. User 20 receives marketing information that is relevant to the television program content displayed by television 2, and therefore may find information about relevant products more quickly. User 20 may also immediately purchase the product associated with the marketing information thereby eliminating search time and effort. In other examples, user 20 may immediately investigate product details after receiving the marketing information thereby increasing user 20's access to product information. In some examples, user 20 may see a trade symbol display in television program content, e.g., the American Red Cross® trade symbol and wish to make a donation. Network server 14 may transmit message 16 containing an advertisement, hyperlink, or other program function that enables the user to make a donation to the organization identified by the trade symbol display.

Figure 4:
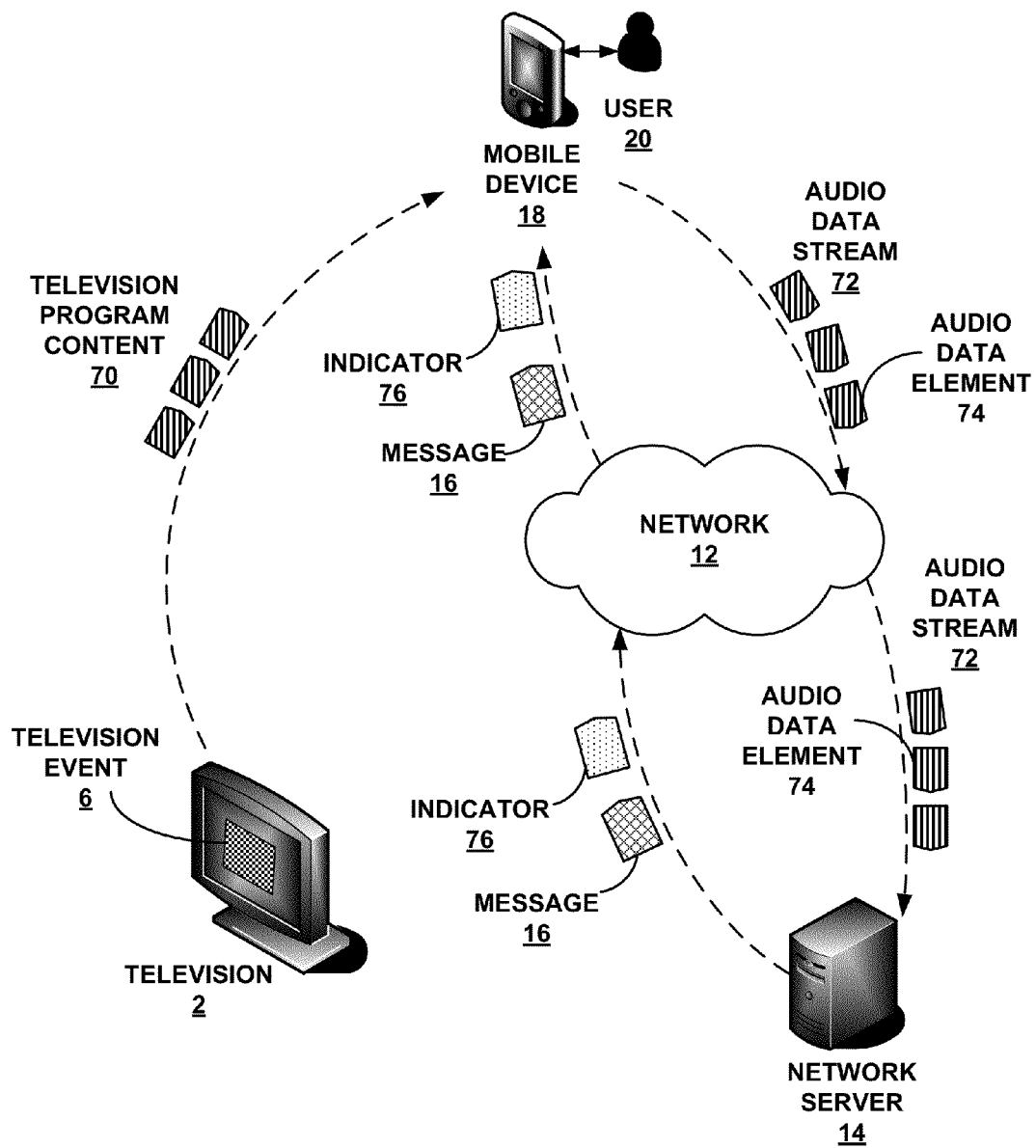
FIG. 4 is a block diagram illustrating another example of a system for transmitting marketing information associated with a television event, in accordance with one or more aspects of the present disclosure.

Various aspects of the disclosure may be operable only when the user has explicitly enabled such functionality. In addition, various aspects of the disclosure may be disabled by the user. Thus, a user may elect to prevent mobile device 18 from sending television event identifier 8 and/or mobile device identifier 10 to network server 14. In addition, a user may prevent mobile device 18 from sending audio data stream 72 (as shown in FIG. 4) to network server 14. In other examples, a user may prevent mobile device 18 from receiving television program content 70 (as shown in FIG. 4). More generally, privacy controls may be applied to all aspects of the disclosure based on a user's privacy preferences to honor the user's privacy preferences for opting in or opting out of the above-described functionality.

Figure 2:
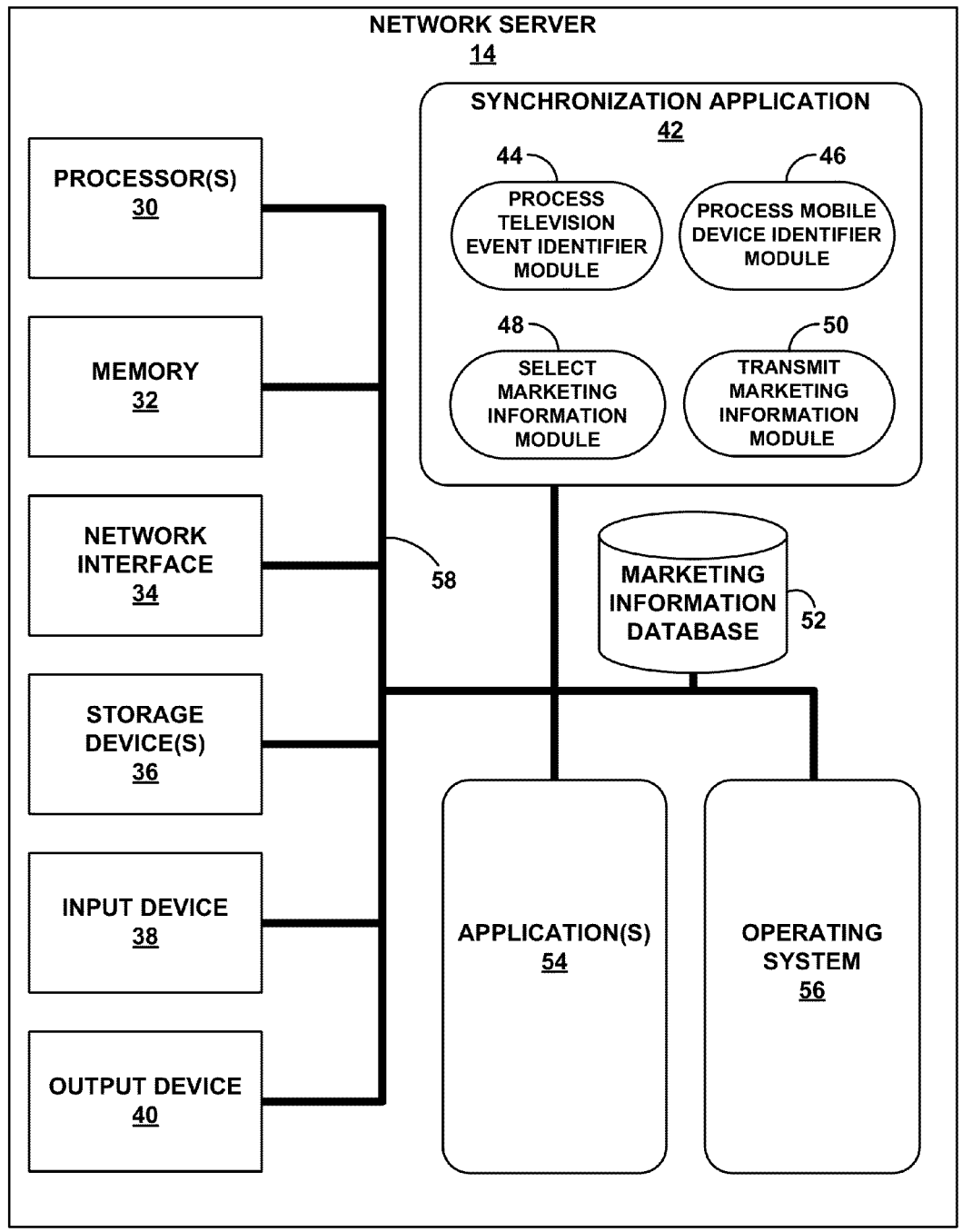
FIG. 2 is a block diagram illustrating further details of one example of a network server as shown in FIG. 1, in accordance with one or more aspects of the present disclosure.

FIG. 2 is a block diagram illustrating further details of one example of a network server as shown in FIG. 1, in accordance with one or more aspects of the present disclosure.

FIG. 2 illustrates only one particular example of network server 14, and many other example embodiments of network 14 may be used in other instances.

As shown in the specific example of FIG. 2, network server 14 includes one or more processors 30, memory 32, a network interface 34, one or more storage devices 36, input device 38, and output device 40. Network server 14 also includes an operating system 56, applications 54, marketing information database 52, and synchronization application 42, which may include modules that are executable by network server 14. Synchronization application 42 modules may include process television event identifier module 44, process mobile device identifier module 46, select marketing information module 48, and transmit marketing information module 50. Applications 54 are also executable by network server 14. Each of components 30, 32, 34, 36, 38, 40, 42, 52, 54, and 56 may be interconnected (physically, communicatively, and/or operatively) for inter-component communications by, e.g., a system bus 58 or network 12.

Processors 30 may be configured to implement functionality and/or process instructions for execution within network server 14. Processors 30 may be capable of processing instructions stored in memory 32 or instructions stored on storage devices 36.

Memory 32 may be configured to store information within network server 14 during operation. Memory 32 may, in some examples, be described as a computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on network server 14 (e.g., one or more of applications 54) to temporarily store information during program execution.

Storage devices 36 may also include one or more computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Network server 14 also includes a network interface 34. Network server 14 may utilize network interface 34 to communicate with external devices, e.g., mobile device 18, using one or more networks, such as one or more wireless networks. Network interface 34 may be a network interface card, such as an Ethernet card, an optical transceiver, a radio frequency transceiver, or any other type of device that can send and receive information. Examples of such network interfaces may include Bluetooth®, 3G and Wi-Fi® radios in mobile computing devices as well as universal serial bus (USB). Examples of such wireless networks may include Wi-Fi®, Bluetooth®, and 3G. In some examples, network server 14 may utilize network interface 34 to wirelessly communicate with an external device such as a server, mobile device 18, or other networked computing device.

Network server 14 may also include one or more input devices 38. Input device 38 may be configured to receive input from a user through tactile, audio, or video feedback. Examples of input device 38 may include a touch-sensitive screen, mouse, a keyboard, a voice responsive system, or any other type of device for detecting a command from a user.

One or more output devices 40 may also be included in network server 14. Output device 40 may be configured to provide output to a user using tactile, audio, or video stimuli. Output device 40 may include a touch-sensitive screen, sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), or any other type of device that can generate intelligible output to a user.

Network server 14 may include operating system 56. Operating system 56 may control the operation of components of network server 14. For example, operating system 56 may facilitate the interaction of applications 54 and synchronization application 42 with processors 30, memory 32, network interface 34, storage device 36, input device 38, and output device 40. Examples of operating system 56 may include Microsoft Windows®, Apple OS X®, Linux®, and Unix®.

Network server 14 may, for example, include marketing information in a marketing information database 52. Marketing information database 52 may be made accessible by Relational Database Management System (RDBMS) software. For example, marketing information database 52 may be a relational database and accessed using a Structured Query Language (SQL) interface that is well known in the art. Marketing information database 52 may alternatively be stored on a separate networked computing device and accessed by network server 14 through network interface 34 or system bus 58. Marketing information database 52 may in other examples be an Object Database Management System (ODBMS), Online Analytical Processing (OLAP) database or other suitable data management system, As discussed above, synchronization application 42 may execute on network server 14. In some examples, synchronization application 42 may receive mobile device identifier 10 and television event identifier 8 from television platform 4. In some examples, synchronization application 42 may determine that the event identifier corresponds to the television event identifier when the event identifier and television event identifier are received. Synchronization application 42 may then select marketing information from marketing information database 52 corresponding to television identifier 8, which may in turn be transmitted in message 16 to mobile device 18. Synchronization application 42 modules may include process television event identifier module 44, process mobile device identifier module 46, select marketing information module 48, and transmit marketing information module 50.

Process television event identifier module 44 may initially receive television event identifier 8. Module 44 may perform initial operations on television event identifier 8 such as extracting and formatting data included in television event identifier 8. Such data may include the a channel identifier, timestamp, product name, manufacturer name, information corresponding to television program content and any other information corresponding television event 6. In one example, module 44 may extract and format television event identifier 8 information including 9 (channel), Apr. 15, 2010 15:35 (timestamp), Toyota Prius® (product name), Toyota Motor Corporation® (product manufacturer), The Office® (television program content), and driving sequence information including, e.g., the setting of the product in the television program content (television event context).

Process mobile device identifier module 46 may initially receive mobile device identifier 10. Module 46 may perform initial operations on mobile device identifier 10 such as extracting and formatting data included in mobile device identifier 10. Such data may include a cellular telephone number, unique Internet identifier or other identification data corresponding to mobile device 18. A unique Internet identifier may include an Internet Protocol (IP) address, Universal Resource Locator (URL), or Media Access Controller Address (MAC).

Select marketing information module 48 may use data from modules 44 and 46 to identify marketing information in marketing information database 52 corresponding to television event 6. In one example, marketing information may be stored in a marketing information database 52. One or more television event identifiers, such as television event identifier 8, may be associated with one or more unique entries of marketing information stored in marketing information database 52. Other data from television event identifier 8, e.g., product name, product manufacturer, television program content, and television event context, may be used to identify one or more unique entries of marketing information stored in the marketing information database 52. Marketing information database 52 may select, using television event identifier 8, the most relevant marketing information to send to mobile device 18.

Transmit marketing information module 50 may perform additional processing on marketing information prior to network server 14 sending marketing information to user 18. For example, module 50 may process marketing information to ensure optimal display on a particular mobile device 18. Module 50 may additionally compress and/or encrypt data to improve transfer time and/or secure transmission of marketing information. In some examples, module 50 may package marketing information in message 16.

Any applications, e.g., applications 54 or synchronization application 42, implemented within or executed by network server 14 may be implemented or contained within, operable by, executed by, and/or be operatively/communicatively coupled to components of network server 14, e.g., processors 30, memory 32, network interface 34, and/or storage devices 36.

Figure 3:
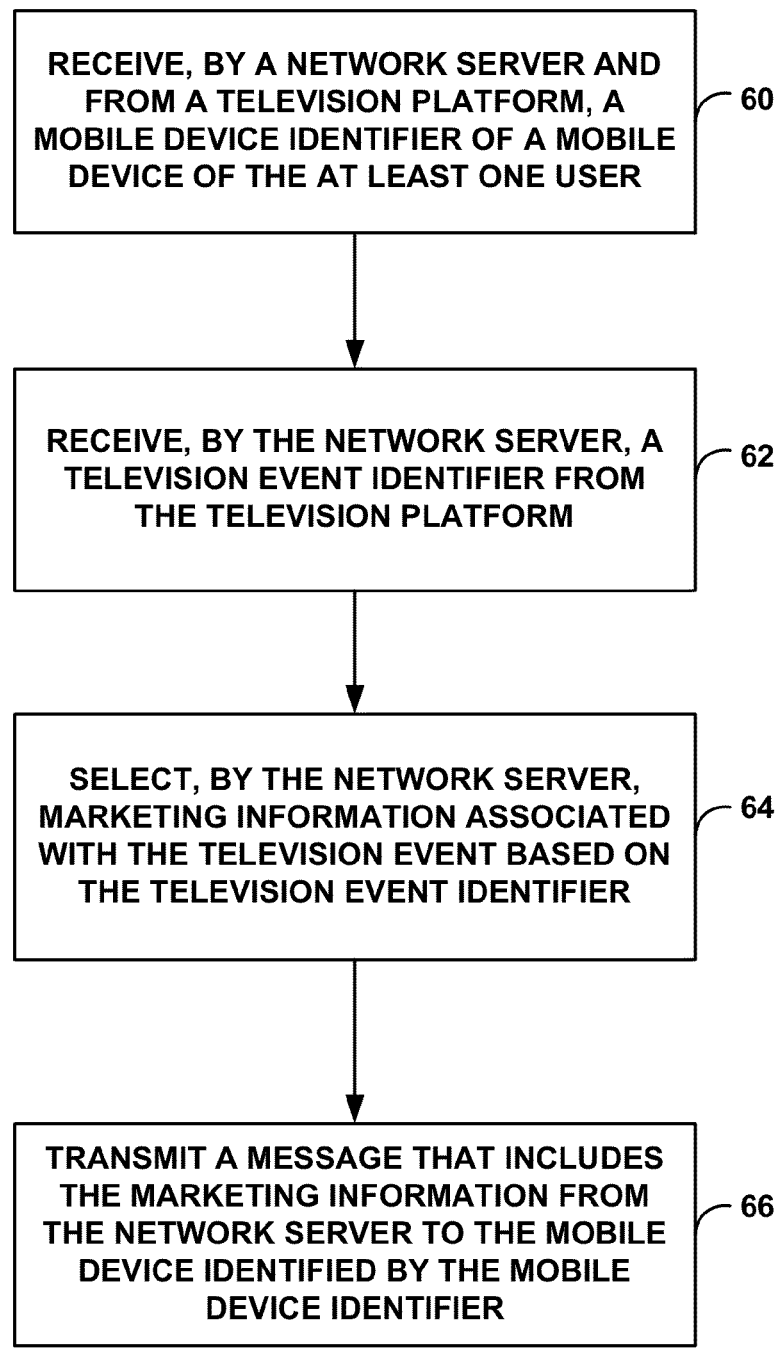
FIG. 3 is a flow diagram illustrating an example method that may be performed by a computing device to synchronize an advertisement stream on a mobile device with the contents of a video source that includes audio data, in accordance with one or more aspects of the present disclosure.

FIG. 3 is a flow diagram illustrating an example method that may be performed by a computing device to synchronize an advertisement stream on a mobile device with the contents of a video source that includes audio data, in accordance with one or more aspects of the present disclosure. As one non-limiting example, the method illustrated in FIG. 3 may be performed by network server 14 shown in FIGS. 1 and/or 2.

The method of FIG. 3 includes, receiving, by a network server and from a television platform that manages television program content provided to at least one user, a mobile device identifier of a mobile device of the at least one user (60). The method further includes receiving, by the network server, a television event identifier from the television platform, wherein the television event identifier is associated with a television event included in the television program content (62). The method also includes selecting, by the network server, marketing information associated with the television event based on the television event identifier, wherein the television event identifier and the mobile device identifier are usable by the network server to determine that the television program content is provided to the at least one user associated with the mobile device (64). The method may further include transmitting, by the network server, a message that includes the marketing information from the network server to the mobile device identified by the mobile device identifier, such that the marketing information may be provided to the at least one user (66).

In one example of the method of FIG. 3, the mobile device of the at least one user may be in physical proximity to the television platform. In some examples, the method of FIG. 3 may include executing, on the mobile device identified by the mobile device identifier, the television platform that manages the television program content provided to the at least one user. In other examples, the method of FIG. 3 may include executing, on a television peripheral external to the mobile device, the television platform that manages the television program content provided to the at least one user. In some examples of the method in FIG. 3, the television event may include a product placement, trade symbol display, or live performance. In some examples, the method of FIG. 3 may include receiving, by the network server, a request from the mobile device to purchase a product associated with the product placement or the live performance. In some examples, the method of FIG. 3 may include receiving, by the network server, a request from the mobile device to make a donation associated with the trade symbol display. In some examples the marketing information may include one or more advertisements.

In some examples a product placement includes a product displayed in the television program content. In some examples, one or more advertisements include audio, video, graphical or sensory content. In some examples, the marketing information includes a price, a product specification, a vendor, or product media. In some examples, the mobile device of the at least one user is in physical proximity to the television platform. In some examples, the television platform detects the mobile device is in physical proximity to the television platform by receiving the mobile device identifier from the mobile device. In some examples, the television event identifier further includes a product name corresponding to the television event, a manufacturer name corresponding to the television event, a timestamp corresponding to the television program content, or a channel identifier corresponding to the television program content. In some examples, the method further includes sending, by the network server, a request to the mobile device for the mobile device identifier of the mobile device. In some examples, selecting, by the network server, marketing information associated with the television event based on the television event identifier further includes: selecting, by the network server, the marketing information based on the television event identifier from a marketing information database. In some examples, the mobile device identifier comprises a cellular telephone number or a unique Internet identifier.

FIG. 4 is a block diagram illustrating another example of a system for transmitting marketing information associated with a television event, in accordance with one or more aspects of the present disclosure. Elements in FIG. 4, previously disclosed in FIG. 1, include the same characteristics as described in FIG. 1 unless otherwise described hereinafter. In one example, television 2 displays television program content 70. A viewer of television program content 70, e.g., user 20, may use mobile device 18 in physical proximity to television 2. Mobile device 18 may receive and perform processing on television program content 70. For example, mobile device 18 may include one or more input devices to receive television program content 70. Input devices could include, for example, a microphone to receive an audio data stream 72 and a video camera to receive a visual data stream (not shown).

In one example, mobile device 18 may receive or detect television program content 70. In one example, television program content may include audio data stream 72. Audio data stream 72 may include one or more audio data elements 74. Audio data elements 74 may be network packets including data representing audio signals contained in television program content 70. Mobile device 18 may perform additional processing on audio data stream 72, e.g., compression, encryption, or other data transformation. Mobile device 18 may transmit audio data stream 72 including audio data elements 74 to network server 14 using network 12.

In some examples, network server 14 may receive audio data stream 72 associated with television program content 70 from mobile device 18 at a first data rate. Network server 14 may perform additional processing on audio data stream 72. For example, network server 14 may identify a channel, based on audio data stream 72, from a channel database 110 (shown in FIGS. 5,8,9). Using the selected channel, network server 14 may identify television event 6 included in television program content 70. In some examples, network server 14 may identify television event 6 using well-known audio recognition techniques that compare audio data in, e.g., an audio data stream and audio samples. For example, network server 14 may compare one or more audio data elements 74 in audio data stream 72 with audio samples associated with channels in the channel database 110 to identify a channel, e.g., target channel 120 (shown in FIG. 8). Network server 14 may compare audio samples of a channel with television events to identify television event 6. Network server 14 may select marketing information based on television event 6. Network server 14 may, using network 12, transmit message 16 that includes the marketing information to mobile device 18, which may be displayed to user 20. The following examples illustrate well-known audio recognition techniques, see, e.g., Haitsma, J., Kalker, T., 2002, A Highly Robust Audio Fingerprinting System, http://citeseerx.ist.psu.edu/viewdoc/download?doi=10.1.1.103.2175&rep=rep1&type=pdf (Nov. 12, 2010). See also, Cano, P., Batlle, E., Kalker, T., Haitsma, J., 2002, A Review of Algorithms for Audio Fingerprinting, http://citeseerx.ist.psu.edu/viewdoc/download?doi=10.1.1.12.5697&rep=rep1&type=pdf (Feb. 7, 2011); Liu, Y., Sik Yun, H., Soo Kim, N., 2009, Audio Fingerprinting Based on Multiple Hashing in DCT Domain, http://hi.snu.ac.kr/newhome/publication/data/SPL200906.pdf (Feb. 7, 2011).

As disclosed above, network server 14 may receive audio data elements 74 from mobile device 18 at a first rate. A first rate may be a data transfer rate at which audio data elements 74 are transmitted. In some examples, after network server 14 has transmitted message 16 that includes marketing information to mobile device 18, network server 14 may receive data elements 72 at a slower rate than the first data rate. The data rate at which audio data elements 74 are received may be reduced after network server 14 has transmitted message 16 because message 16 indicates that network server 14 has identified the channel, e.g., a target channel (shown in FIGS. 8, 9). Because the target channel may be identified, fewer audio data elements may be required to identify the channel, e.g., the target channel, presently viewed by user 20. One or more benefits may be associated with lowering the data rate at which audio data elements 74 are transmitted from mobile device 18 to network server 14. For example, mobile device 18 may have limited battery life and processing power. Reducing the data rate at which audio data elements 74 are transmitted may increase battery life and reduce resource requirements. In an alternative example, network server 14 may not be required to send message 16 to mobile device in order to lower the data rate.

In some examples, network server 14 may receive a second group of data elements from mobile device 18 at the slower rate, select a second audio sample from the second group of data elements, and compare the second audio sample to audio samples associated with the target channel in the channel database. Network server 14 may determine, based on the comparison, that the second audio sample is not associated with audio samples of the target channel in the channel database. If the second audio sample is not associated with audio samples of the target channel, mobile device 18 may be receiving television program content 70 from a different channel than the target channel. To identify the new channel, network server 14 may transmit an indicator 76 to mobile device 18 to increase the data rate at which mobile device 18 transmits audio data stream 72. Indicator 76 may be any data capable of informing mobile device 18 to increase the data rate that audio data stream 72 is transmitted from mobile device 18 to network server 14. Network server 14 may receive a third group of data elements in audio data stream 72 from mobile device 18 at a third data rate that is higher than the second data rate. The increased data rate may provide network server 14 with a larger quantity of audio data elements. The larger quantity of audio data elements may enable network server 14 to perform more comparisons with audio samples, e.g., in a channel database, and therefore more quickly identify the channel presently viewed by user 20.

In one example scenario, presented for purposes of illustration only, mobile device 18 initially sends audio data elements 74 to mobile device 18 at a first rate, e.g., 100 kilobits/second. Network server 14 may process audio data elements 74 according to aspects of the disclosure to identify a target channel, e.g., "channel 9". Once network server 14 has identified "channel 9" as the channel that is displaying television program content 70 to user 20, network server 14 may send message 16 including, e.g., an advertisement, to user 20. Because the channel viewed by user 20 has been identified, network server 14 may send indicator 76 to mobile device 18. In some examples, message 16 received by mobile 18 may also function as indicator 76, and therefore network server 14 need not send indicator 76. Indicator 76 may instruct mobile device 18 to send audio data elements 74 at a second data rate that is slower than the first data rate, e.g., 10 kilobits/second. Network server 14, thus may receive subsequent audio data elements 74 at, e.g., 10 kilobits/second. At a later point in time, network server 14 may determine based on its comparisons that audio data elements 74 do not match audio samples of the target channel in the channel database and therefore mobile device 18 is receiving television program content 70 of a different channel than the target channel. Network server 14 may send another indicator 76 to mobile device 18 that instructs module device 18 to send audio data elements 74 at a third data rate that is higher than the second data rate, e.g., 120 kilobits/second. Increasing data rate at which audio data elements 74 are sent to mobile device 18 provides network server 14 with a larger amount of data to perform comparisons and ultimately identify the target channel.

Various aspects of the disclosure may provide, in certain instances, one or more benefits and advantages. For example, when a viewer, e.g., user 20, watches television program content while using mobile device 18 in physical proximity to television platform 4, the user will advantageously receive marketing information corresponding to the television program content 70. User 20 receives marketing information that is relevant to the television program content displayed by television 2, and therefore may find information about relevant products more quickly. User 20 may also immediately purchase the product associated with the marketing information thereby eliminating search time and effort. In other examples, user 20 may immediately investigate product details after receiving the marketing information thereby increasing user 20's access to product information. In some examples, user 20 may see a trade symbol display in television program content, e.g., the American Red Cross® trade symbol and wish to make a donation. Network server 14 may transmit message 16 containing an advertisement, hyperlink, or other program function that enables the user to make a donation to the organization identified by the trade symbol display.

Figure 5:
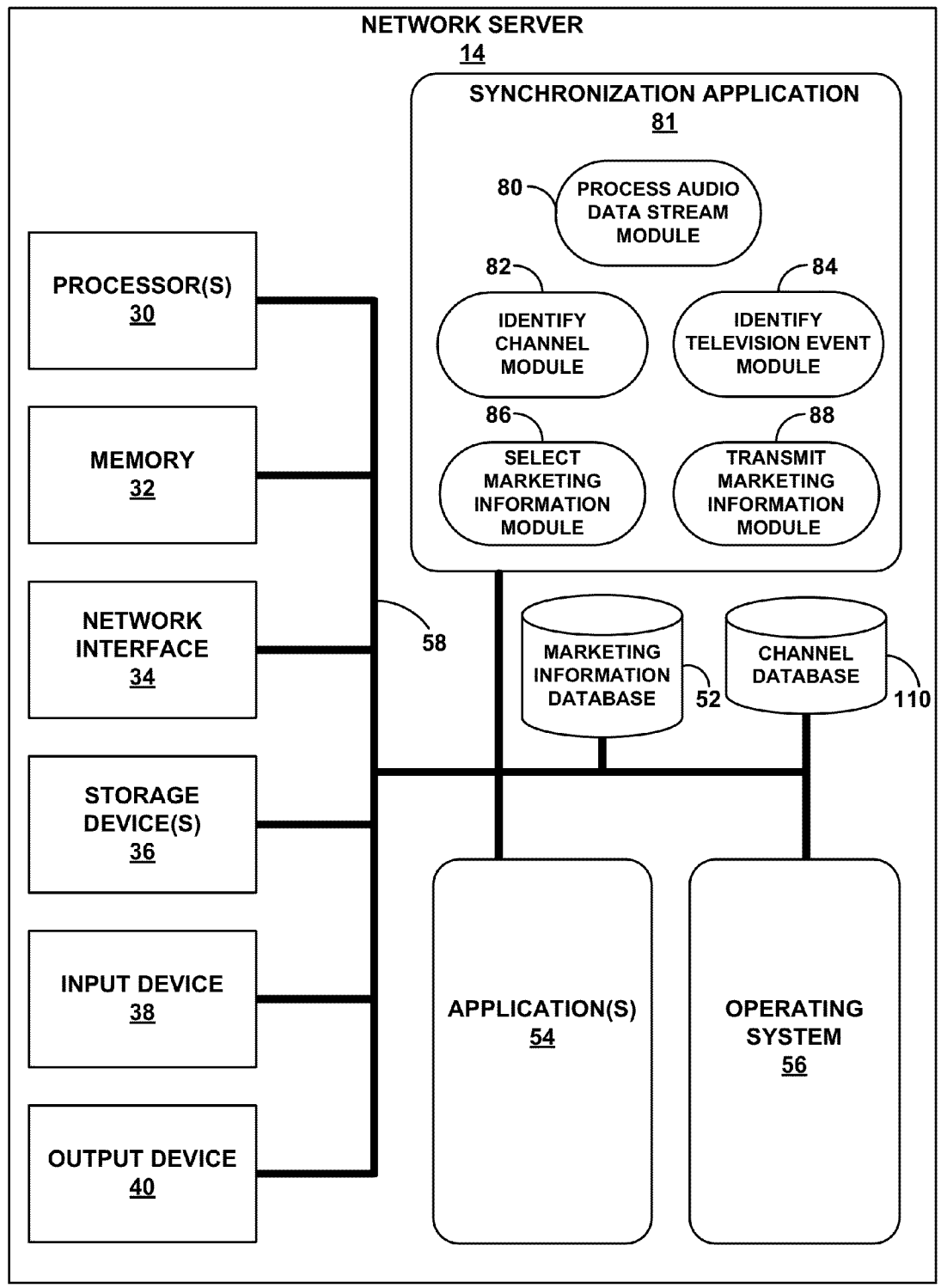
FIG. 5 is a block diagram illustrating further details of one example of a network server as shown in FIG. 4, in accordance with one or more aspects of the present disclosure.

FIG. 5 is a block diagram illustrating further details of one example of network server 14 as shown in FIG. 4, in accordance with one or more aspects of the present disclosure. FIG. 5 illustrates only one particular example of network server 14, and many other example embodiments of network 14 may be used in other instances. Elements in FIG. 5, previously disclosed in FIG. 2, include similar characteristics as described in FIG. 1 unless otherwise described hereinafter.

As shown in the specification example of FIG. 5, synchronization application 81 may execute on network server 14. In some examples, synchronization application 81 may receive audio data elements from mobile device 18. Synchronization application 81 may then process audio data elements using modules included in synchronization application 81. These modules may include process audio data stream module 81, identify channel module 82, identify television event module 84, select marketing information module 86, and transmit information module 88.

Process audio data stream module 80 may initially receive audio data stream 72. Module 81 may perform operations on audio data stream 72, such as extracting and formatting data included in audio data stream 72. Such data may include audio data containing the product name, manufacturer name, or any other audio data corresponding to television program content. In one example scenario, module 81 may extract and format audio data corresponding to Toyota Prius® (product name), Toyota Motor Corporation® (product manufacturer), The Office® (television program content), and driving sequence information including, e.g., the setting of the product in the television program content (television event context). Extracting and/or formatting audio data from the audio data stream may allow the audio data to be used to identify a channel, television event, or marketing information. In some examples, process audio stream module 80 may decrypt audio data stream 72. In other examples, process audio stream module 80 may decompress audio data stream 72.

Identify channel module 82 may process data, e.g., audio data, included in audio data stream 72 to identify a channel associated with audio data stream 72. In some examples, identify channel module 82 may query a channel database of audio samples based on audio data stream 72 to identify a corresponding channel. In some examples, the audio samples may be associated with channels. Module 82 may identify a channel based on an audio sample. For example, upon receiving audio data in an audio data stream corresponding to The Office® television program, identify channel module 82 may query audio samples in a channel database to identify the channel on which the television show is broadcasted.

Identify television event module 84 may utilize a channel, e.g., from identify channel module 82, to identify a television event. For example, marketing information database 52 or channel database 110 may include associations between channels and television events. Identify television event module 84 may query these associations using a channel identifier to identify a corresponding television event. For example, a channel identifier for The Office® television program and audio data corresponding to The Office® television program may be used to query associations between channel identifiers and televisions events in marketing information database 52 or channel database 110. Based on the associations, the query may retrieve a television event that may be used to retrieve corresponding marketing information, e.g., Toyota Prius® or Toyota Motor Corporation®.

Select marketing information module 86 may utilize a television event to select marketing information. For example, marketing information database 52 may include associations between marketing information and television events. Select marketing information module 86 may query these associations using a television event to select corresponding marketing information. For example, a television event, e.g., featuring a Toyota Prius® in a segment of The Office®, may be associated with marketing information for the Toyota Prius® in the marketing information database. Select marketing information module 86 may query the marketing information database 52 to retrieve marketing information, e.g., an advertisement for a Toyota Prius®.

Transmit marketing information module 88 may process marketing information to send a corresponding message to a computing device, e.g., a mobile device. For example, transmit marketing information module 88 may receive marketing information from select marketing information module 86. Module 88 may process this marketing information, e.g., compress, encrypt, and/or package the marketing information for network transport from network server 14 to a computing device, e.g., a mobile device. For example, module 88 may format a Toyota Prius® advertisement to display properly on a particular mobile device. The advertisement may further be encrypted, compressed and/or packaged in a message before being sent from network server 14 to mobile device 18.

An advertisement packaged in a message may be media content that includes audio, video, graphical or other sensory content. For example, graphical content may include hyperlinks, pictures, text, and/or animations. In addition, the advertisement may enable user interaction with the advertisement, e.g., making selections or altering the content of the advertisement. For example, the user may select the hyperlink and navigate to the corresponding content associated with the hyperlink.

Figure 6:
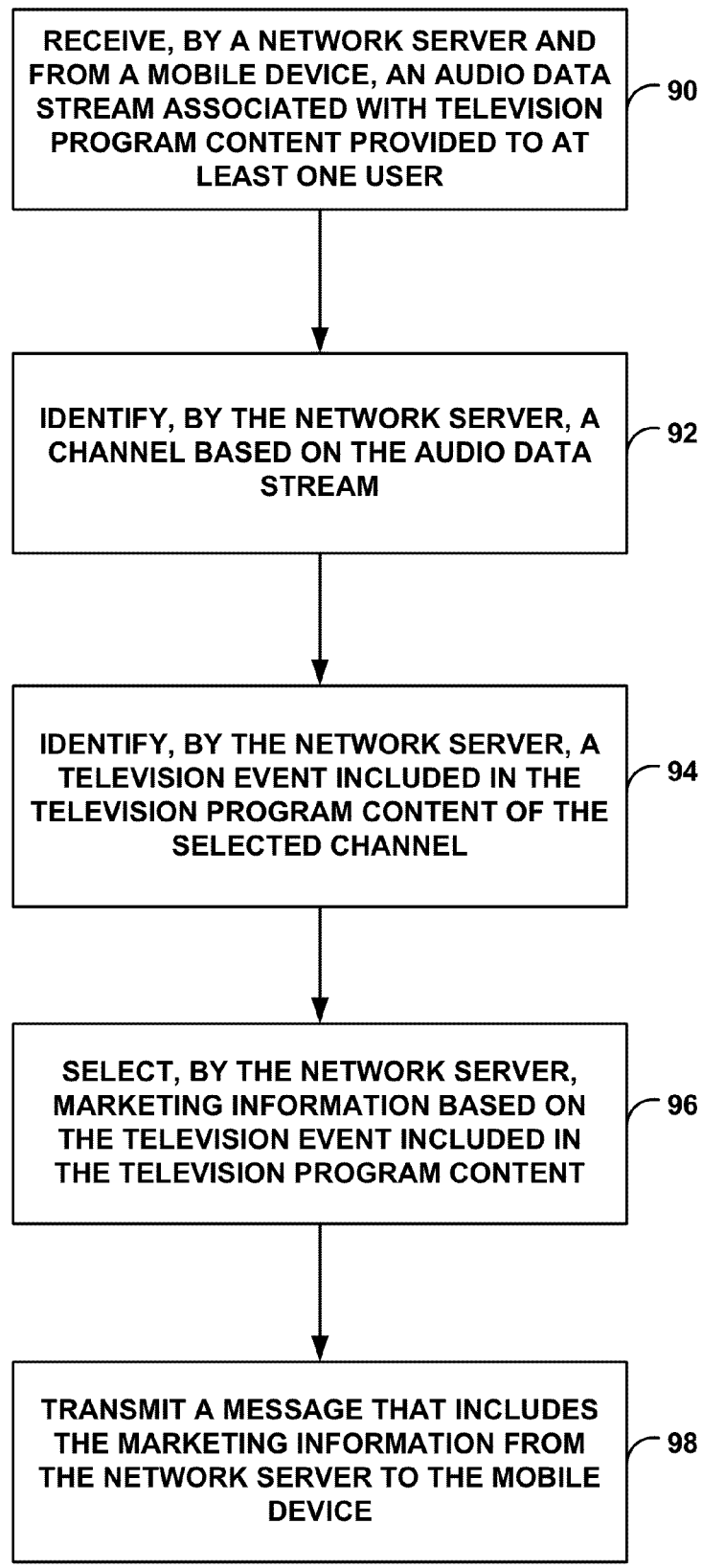
FIG. 6 is a flow diagram illustrating an example method that may be performed by a computing device to synchronize an advertisement stream on a mobile device with the contents of a video source that includes audio data, in accordance with one or more aspects of the present disclosure.

FIG. 6 is a flow diagram illustrating an example method that may be performed by a computing device to synchronize an advertisement stream on a mobile device with the contents of a video source that includes audio data, in accordance with one or more aspects of the present disclosure. As one non-limiting example, the method illustrated in FIG. 6 may be performed by network server 14 shown in FIGS. 4 and/or 5.

The method of FIG. 6 includes, receiving, by a network server and from a mobile device, an audio data stream associated with television program content provided to at least one user at a first data rate (90). The method further includes identifying, by the network server, a channel based on the audio data stream (92). The method further includes identifying, by the network server, a television event included in the television program content of the selected channel (94). The method further includes selecting, by the network server, marketing information based on the television event included in the television program content (96). The method further includes transmitting, by the network server, a message that includes the marketing information from the network server to the mobile device, such that the marketing information may be provided to the at least one user (98).

In one example, the method of FIG. 6 may include receiving, by the network server and from the mobile device, a television program timestamp, wherein the television program timestamp is associated with the television program content provided to the at least one user; and selecting, by the network server, a channel based on the audio data stream and the television program timestamp. In some examples, the method may include receiving, by the network server and from the mobile device, geo-mapping data including location information of the mobile device; and processing, by the network server, the geo-mapping data to identify the channel in the audio data stream. In some examples of FIG. 6, the method of receiving, by a network server and from a mobile device, an audio data stream associated with television program content provided to at least one user at a first data rate, further includes receiving, by the network server and after transmitting the message that includes the marketing information from the network server to the mobile device, a first group of data elements of the audio data stream from the mobile device at a second data rate slower than the first data rate.

In another example, the method of FIG. 6 may include selecting, by the network server, at least one audio sample from the audio data stream; and comparing, by the network server, the at least one audio sample to audio samples associated with a plurality of different channels in a channel database, wherein identifying the channel includes identifying a target channel of the plurality of different channels based on the comparison. In some examples of FIG. 6, comparing, by the network server, the at least one audio sample to audio samples associated with a plurality of different channels in a channel database further includes receiving, by the network server and from the mobile device, a television program timestamp, wherein the television program timestamp is associated with the television program content provided to the at least one user; and comparing, by the network server, the television program timestamp to television program timestamps associated with a plurality of different channels in a channel database.

In some examples, the location information further includes a latitude coordinate and a longitude coordinate. In some examples, the method includes identifying the target channel in a channel database based on searching only one or more channels in the channel database identified by the geo-mapping data. In some examples, a channel database further comprises one or more audio samples, one or more channels, and one or more associations between the audio samples and the one or more channels. In some examples, receiving an audio data stream associated with television program content provided to the at least one user further includes receiving the audio data stream at a first data rate.

Figure 10:
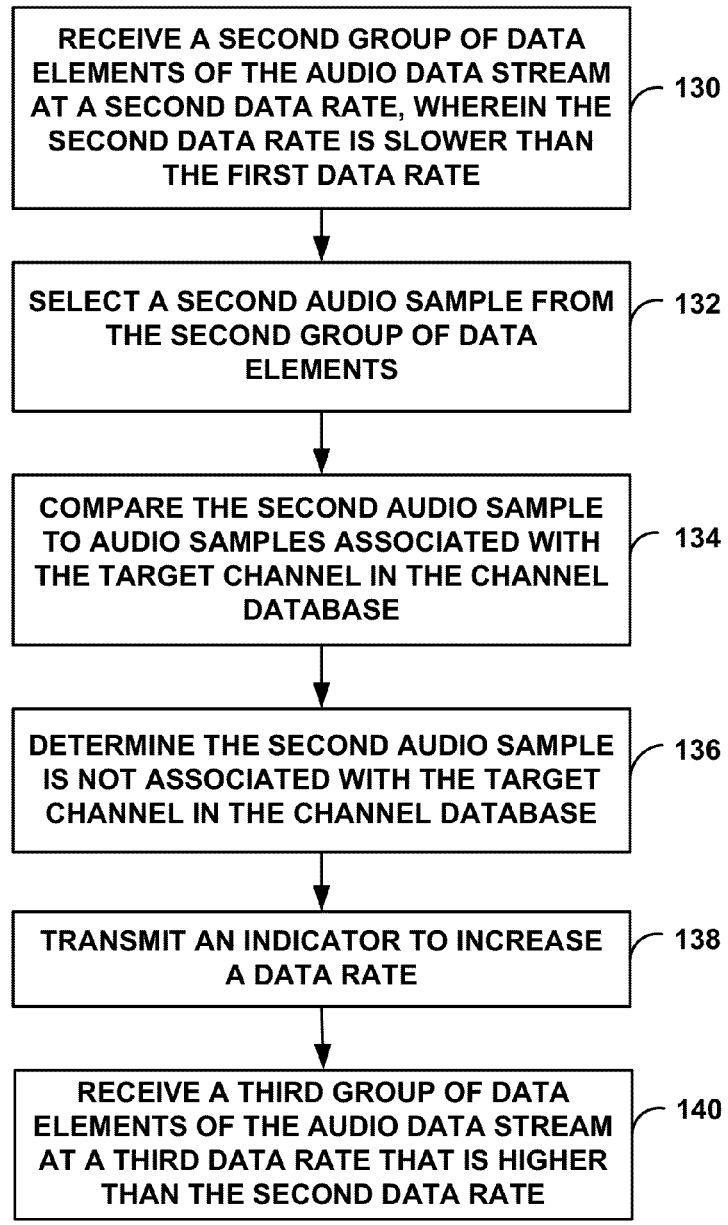
FIG. 10 is a flow diagram illustrating an example method that may be performed by a computing device to synchronize an advertisement stream on a mobile device with the contents of a video source that includes audio data, in accordance with one or more aspects of the present disclosure.

FIG. 10 illustrates another example of FIG. 6. FIG. 10 is a flow diagram illustrating an example method that may be performed by a computing device to synchronize an advertisement stream on a mobile device with the contents of a video source that includes audio data, in accordance with one or more aspects of the present disclosure. In one example of FIG. 10, the method includes receiving, by a network server and from a mobile device, an audio data stream associated with television program content provided to at least one user at a first data rate includes receiving, by the network server, a second group of data elements of the audio data stream from the mobile device at a second data rate, wherein the second data rate is slower than the first data rate (130). The method further includes selecting, by the network server, a second audio sample from the second group of data elements (132). The method further includes comparing, by the network server, the second audio sample to audio samples associated with the target channel in the channel database (134). The method further includes determining, by the network server, the second audio sample is not associated with the target channel in the channel database (136). The method further includes transmitting, by the network server to the mobile device, an indicator to increase a data rate (138). The method further includes receiving, by the network server and from the mobile device, a third group of data elements of the audio data stream at a third data rate that is higher than the second data rate (140).

In some examples of FIG. 6, the television event is a product placement, trade symbol display, or live performance. In some examples, the method includes receiving, by the network server, a request from the mobile device to purchase a product associated with the product placement or the live performance. In some examples, the method includes receiving, by the network server, a request from the mobile device to make a donation associated with the trade symbol display. In some examples, the audio data stream includes an encoded audio data stream or a compressed audio data stream. In some examples, the marketing information includes one or more advertisements.

Figure 7:
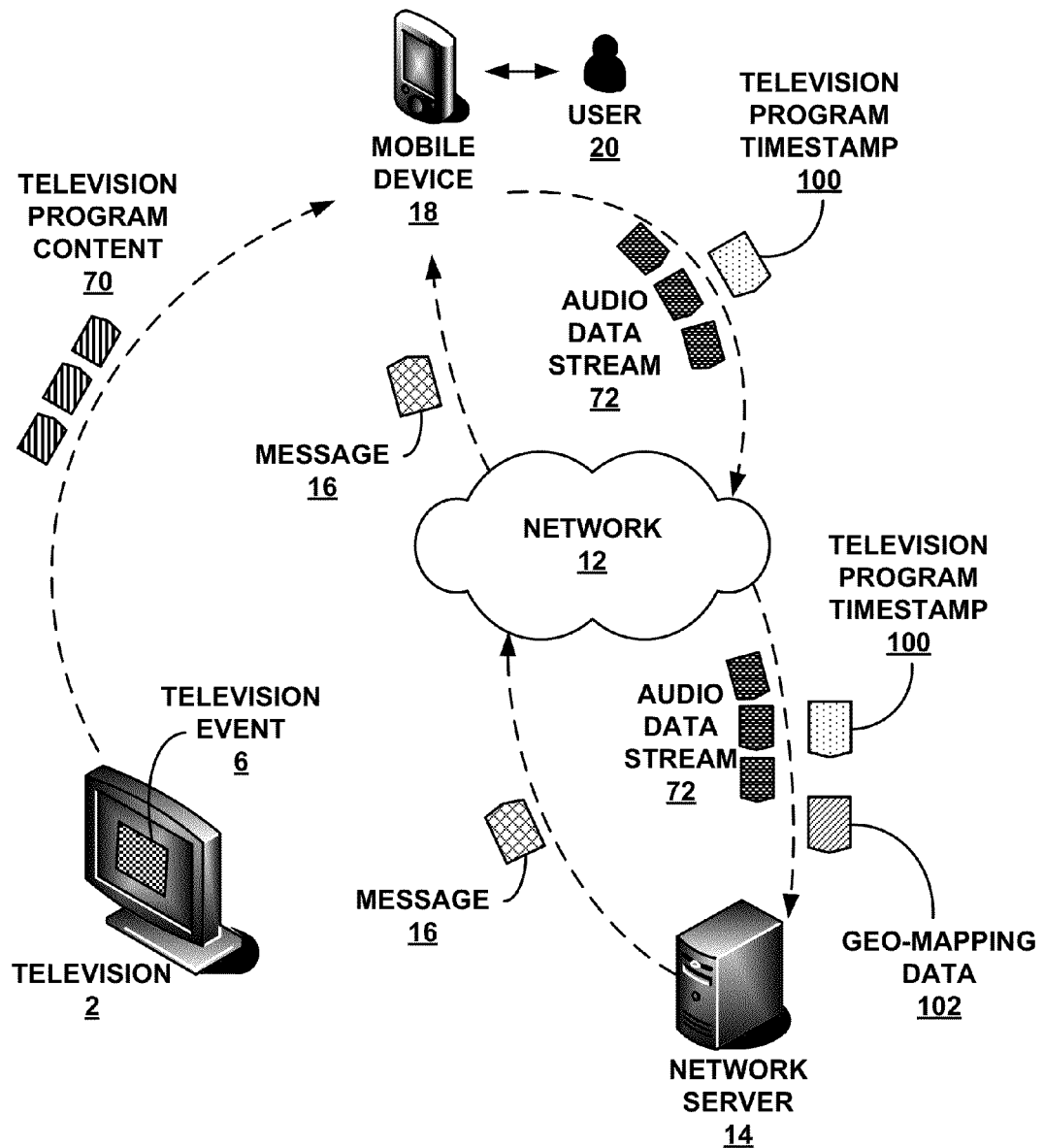
FIG. 7 is a block diagram illustrating another example of a system for transmitting marketing information associated with a television event using television program timestamps and geo-mapping data, in accordance with one or more aspects of the present disclosure.

FIG. 7 is a block diagram illustrating another example of a system for transmitting marketing information associated with a television event using television program timestamps and geo-mapping data, in accordance with one or more aspects of the present disclosure. Elements in FIG. 7, previously disclosed in FIG. 5, include similar characteristics as described in FIG. 5 unless otherwise described hereinafter. FIG. 7 illustrates a system substantially similar to FIG. 5. However, FIG. 7 further includes television program timestamp 100 and geo-mapping data 102. Television program timestamp 100 and geo-mapping data 102 may enable network server 14 to more quickly identify audio samples, channels, television events, and marketing information by quickly narrowing the search requirements of queries performed by a channel database.

In one example, television program timestamp 100 may be date and time information corresponding to television program content 70. In one example, television program content 70 may be broadcasted, e.g., on Apr., 2, 2009 at 1:00 am. Television program timestamp 100 may, in one example, be formatted as Apr. 2, 2009 01:00. Television program timestamp 100 may advantageously be used by network server 14 to quickly narrow the search for an audio sample in a channel database (shown in FIGS. 5,8,9). For example, if mobile device 18 includes television program timestamp 100, e.g., Apr. 2, 2009 01:00, with audio data stream 72, network server 14 may limit its search in the channel database to audio samples identified at approximately Apr. 2, 2009 01:00. By limiting its search, network server 14 may reduce its resource usage and improve its search time to identify the channel associated with the audio sample.

In another example, geo-mapping data 102 may further be used to reduce resource usage and improve search time on network server 14. In one example, television program content 70 may be broadcast in a particular geographic region. Additionally, mobile device 18 may have the capability to identify its geographic location using, e.g., global positioning system (GPS) functionality. For example, geo-mapping data 102 may include geographic coordinates such as a latitude and longitude in a geographic coordinate system. When mobile device 18 receives television program content 70, mobile device 18 may send geo-mapping data 102 and audio data stream 72 to network server 14. Network server 14 may use geo-mapping data 102 to identify from, e.g., a channel database, only channels currently displayed in a particular geographic region. Thus, when network server 14 searches for an audio sample in a channel database, network server 14 may only need to search channels broadcasted in a particular region identified by geo-mapping data 102. By limiting its search, network server 14 may reduce its resource usage and improve its search time to identify the channel associated with the audio sample.

Figure 8:
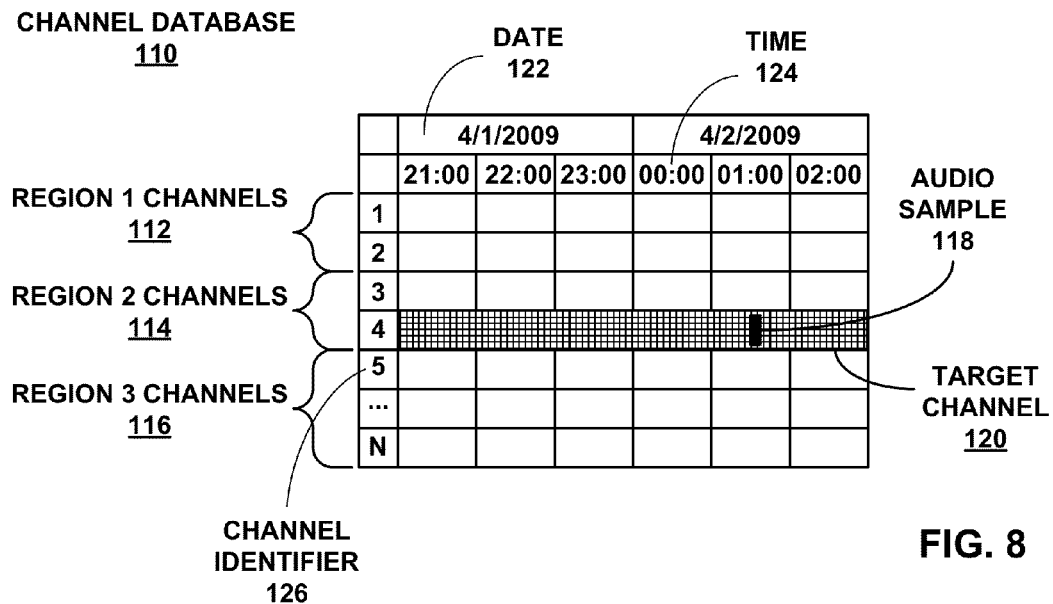
FIGS. 8 and 9 are diagrams illustrating example channel databases, in accordance with one or more aspects of the present disclosure.

FIG. 8 is a diagram illustrating a channel database 110, in accordance with one or more aspects of the present disclosure. As previously disclosed, network server 14 may identify a channel using audio data stream 72 and channel database 110. Channel database 110 may include a collection of one or more audio samples 118 associated with channels. One or more audio samples 118 may be organized by channel identifier 126, date 122, and time 124. Channel identifier 126 may be any data capable of identifying a channel on which television program content is broadcast. Channels, e.g., target channel 120, may be grouped according to the geographic region in which the channels are broadcasted. For example, target channel 120 is broadcast in region 2 in the example of FIG. 8. Audio sample 118 may be one or more discrete units of data representing an audio signal, which may match audio data elements 74 corresponding to television program content 70.

Audio sample 118 may further be associated in a database, e.g., a marketing information database, with a television event. Network server 14, after receiving one or more audio data elements, may compare the audio data elements 74 with audio samples 118 to identify a target channel 120. Target channel 120 may refer to the channel presently viewed by user 20. Target channel 120 may broadcast television program content 70 viewed by user 20 that includes audio data stream 72. Once a channel, e.g., target channel 120, has been identified, network server 14 may identify television event 6 included in television program content 70 of target channel 120 as disclosed above in, e.g., FIG. 5. In some examples, date and time information may also be used to identify television event 6. Network server 14 may then select marketing information based on television event 6 and transmit a message including the marketing information to mobile device 18. Marketing information based on television event 6 may be selected from, e.g., marketing information database 52 as shown in FIG. 2.

Figure 9:
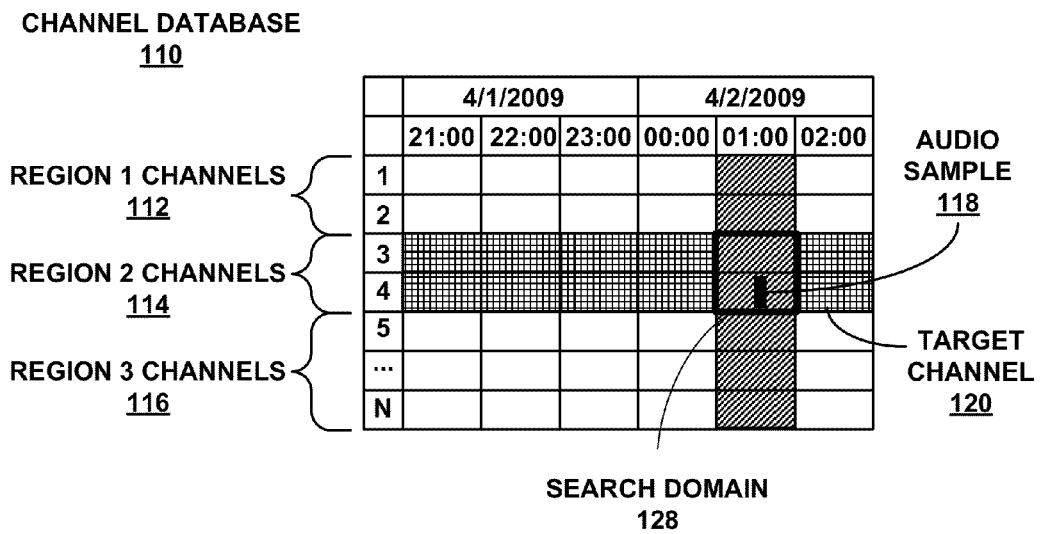

FIG. 9 is a diagram illustrating a channel database, in accordance with one or more aspects of the present disclosure. Elements in FIG. 9, previously disclosed in FIG. 8, include similar characteristics as described in FIG. 8 unless otherwise described hereinafter. FIG. 9 illustrates the use of television program timestamp 100 and geo-mapping data 102 with a channel database 110 as previously disclosed in FIG. 7.

In one example, channels, e.g., target channel 120, may be grouped geographically in the channel database 110 according to the geographic regions in which the channels are broadcasted. For example, target channel 120 is grouped in geographic region 2 because it may be broadcast in region 2. Audio samples 118 in channel database 110 may also be organized according to the date and time that the audio sample is broadcast on a particular channel. For example, audio sample 118 is broadcasted on target channel 120, at 1:00 AM, Apr. 2, 2009 in geographic region 2.

In one example of FIGS. 7 and 9, mobile device 18 may provide geo-mapping data 102, e.g., global positioning coordinates, and television program timestamp 100, e.g., date and time, to network server 14 with audio data stream 72. Network server 14, when querying channel database 110 for an audio sample that matches audio data stream 72, may use the television program timestamp 100 and geo-mapping data 102 to search only portions of channel database 110 where the audio sample may be located. For example, geo-mapping data 102 may indicate that mobile device 18 is in geographic region 2. Television program timestamp 100 may indicate that audio data stream 72 was broadcasted at a particular time and date, e.g., Apr. 2, 2009 at 1:00 AM. Thus, network server 14 may only search the channel database according to the geographic region, date, and time when network server 14 seeks to identify audio sample 118 that corresponds to audio data stream 72. In other words, the network server 14 only searches a search domain 128 in channel database 110 that may be defined by the geographic region, date, and time in which the audio data stream is broadcasted. Search domain 128 may be any portion of the channel database 110 to be searched. Because search domain 128 is substantially smaller than the entire channel database, the search may occur more quickly and require less computing resources.

Figure 11:
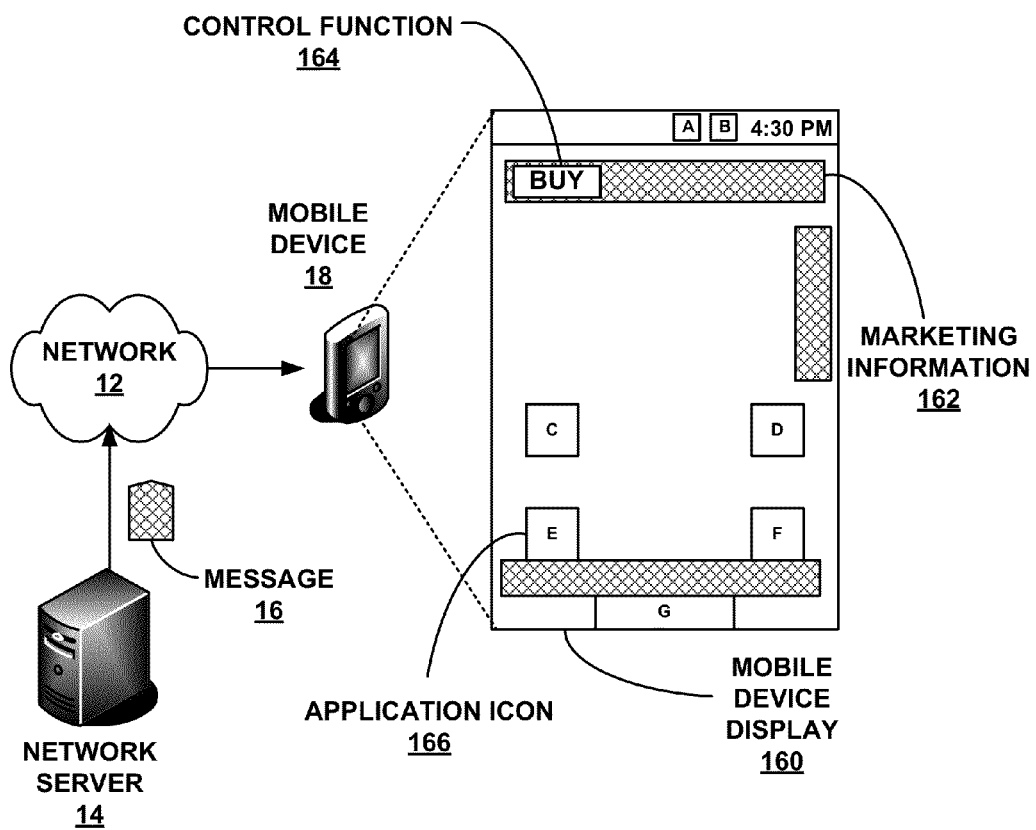
FIG. 11 is a block diagram illustrating another example of a system for transmitting marketing information associated with a television event, in accordance with one or more aspects of the present disclosure.

FIG. 11 is a block diagram illustrating another example of a system for transmitting marketing information associated with a television event, in accordance with one or more aspects of the present disclosure. In one, non-limiting example, mobile device 18 may be in proximity to a television displaying a television event. Network server 14 may select marketing information 162 based on the television event and include marketing information 162 in a message 16. Network server 14 may send message 16 using a network 12 to mobile device 18. In some examples, mobile device 18 may process marketing information 162 to prepare it for display to mobile device display 160. Mobile device 18 may display marketing information 162 to mobile device display 160 in various locations of display 160.

Marketing information may be displayed on mobile device display in a user-friendly presentation that, e.g., does not obstruct use of other features, e.g., application icons 166. In some examples, mobile device 18 may provide one or more control functions 164 associated with marketing information 162. Control function 164 may be a button, hyperlink, or other program logic that, when executed by a user through interaction with mobile device 18, allows the user to take additional action with respect to marketing information 162. For example, FIG. 11 displays control function 164 as a "BUY" purchase button. In one example, marketing information 162 may be an advertisement of music. A user of mobile device 18 may wish to purchase the music and therefore may select the "BUY" purchase button, e.g., control function 164. Selecting control function 164 may direct mobile device 18 to open a web page where the music may be bought or control function 164 may provide functionality to purchase the music directly by the user of mobile device 18. In other examples, control function 164, when selected, may display locations where the item or items in the marketing information may be purchased. For example, if a music compact disc is displayed in the marketing information, corresponding locations where the compact disc is sold may also be displayed. The locations may further be selected based on the user's current geographic location.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the present disclosure have been described. These and other embodiments are within the scope of the following claims.

The invention claimed is:
1. A method comprising:
responsive to a television platform detecting that a mobile device is in physical proximity to the television platform based on the television platform periodically requesting a mobile device identifier of the mobile device, receiving, by a network server and from the television platform that manages television program content provided to at least one user, a mobile device identifier of the mobile device associated with the at least one user, wherein the mobile device identifier is at least one of a telephone number and an identifier that uniquely identifies the mobile device, wherein the at least one of the telephone number and the identifier that uniquely identifies the mobile device has been previously received by the television platform in response to the television platform having detected that the mobile device is in physical proximity to the television platform, wherein the television platform is implemented at a television peripheral device that is external to the mobile device;

responsive to the television platform identifying a television event within the television program content based on processing the television program content as the television program content is displayed, receiving, by the network server, a television event identifier from the television platform, wherein the television event identifier is associated with the television event included in the television program content;

determining, by the network server, that the television event identifier associated with the television event corresponds to a television event identifier of a marketing information database, wherein marketing information is associated with the television event identifier of the marketing information database;

selecting, by the network server, the marketing information associated with the television event identifier of the marketing information database, wherein the television event identifier associated with the television event and the mobile device identifier are usable by the network server to determine that the television program content is provided to the at least one user associated with the mobile device; and using the mobile device identifier received from the television platform to transmit, by the network server, a message that includes the marketing information from the network server to the mobile device identified by the mobile device identifier, such that the marketing information is displayable to the at least one user.

2. The method of claim 1, wherein the television event comprises a product placement, trade symbol display, or live performance.

3. The method of claim 2, wherein a product placement comprises a product displayed in the television program content.

4. The method of claim 2, wherein the television event comprises the product placement or the live performance, and wherein the method further comprises:

responsive to transmitting the message, receiving, by the network server, a request from the mobile device to purchase a product associated with the product placement or the live performance based on the marketing information.

5. The method of claim 2, wherein the television event comprises the trade symbol display, and wherein the method further comprises:

receiving, by the network server, a request from the mobile device to make a donation associated with the trade symbol display.

6. The method of claim 1, wherein the marketing information includes one or more advertisements.

7. The method of claim 6, wherein the one or more advertisements comprise audio, video, graphical or sensory content.

8. The method of claim 1, wherein the marketing information comprises a price, a product specification, a vendor, or product media.

9. The method of claim 1, wherein the mobile device of the at least one user is in physical proximity to the television platform.

10. The method of claim 1, wherein the television event identifier associated with the television event further comprises a product name corresponding to the television event, a manufacturer name corresponding to the television event, a timestamp corresponding to the television program content, or a channel identifier corresponding to the television program content.

11. The method of claim 1, wherein transmitting, by the network server, the message that includes the marketing information from the network server to the mobile device further comprises:

determining, by the network server, that the mobile device is identified by the mobile device identifier; and sending, by the network server, the message to the mobile device.

12. A computer-readable storage device encoded with instructions that cause one or more processors of a computing device to:

responsive to a television platform automatically detected that a mobile device is in physical proximity to the television platform based on the television platform periodically requesting a mobile device identifier of the mobile device, receive, by a network server and from the television platform that manages television program content provided to at least one user, a mobile device identifier of the mobile device associated with the at least one user, wherein the mobile device identifier is at least one of a telephone number and an identifier that uniquely identifies the mobile device, wherein the at least one of the telephone number and the identifier that uniquely identifies the mobile device has been previously received by the television platform in response to the television platform having detected that the mobile device is in physical proximity to the television platform, wherein the television platform is implemented at a television peripheral device that is external to the mobile device;

responsive to the television platform identifying a television event within the television program content based on processing the television program content in real-time as the television program content is displayed, receive, by the network server, a television event identifier generated by the television platform, wherein the television event identifier is associated with the television event included in the television program content;

determine, by the network server and based on data of the television event identifier indicating at least one of a television event context and the television program content, that the television event identifier associated with the television event corresponds to a television event identifier of a marketing information database;

select, by the network server, a portion of most relevant marketing information from marketing information that is associated with the television event identifier of the marketing information database, wherein the television event identifier associated with the television event and the mobile device identifier are usable by the network server to determine that the television program content is provided to the at least one user associated with the mobile device; and responsive to processing the portion of the most relevant marketing information for display at the mobile device, using the mobile device identifier received from the television platform to transmit, by the network server, a message that includes the portion of the most relevant marketing information from the network server to the mobile device identified by the mobile device identifier, such that the marketing information is displayable to the at least one user.

13. A computing device, comprising:

one or more processors;

a synchronization application operable by the one or more processors to:

responsive to a television platform detecting that a mobile device is in physical proximity to the television platform based on the television platform periodically requesting a mobile device identifier of the mobile device, receive from the television platform a mobile device identifier of the mobile device associated with at least one user, wherein the mobile device identifier is at least one of a telephone number and an identifier that uniquely identifies the mobile device, wherein the at least one of the telephone number and the identifier that uniquely identifies the mobile device has been previously received by the television platform in response to the television platform having detected that the mobile device is in physical proximity to the television platform, wherein the television platform is implemented at a television peripheral device that is external to the mobile device;

responsive to the television platform identifying a television event within the television program content based on processing the television program content in real-time as the television program content is displayed, receive a television event identifier from a television platform, wherein the television event identifier is associated with the television event included in the television program content;

determine that the television event identifier associated with the television event corresponds to a television event identifier of a marketing information database;

select most relevant marketing information from marketing information that is associated with the television event identifier of the marketing information database, wherein the television event identifier associated with the television event and the mobile device identifier are usable by the computing device to determine that the television program content is provided to the at least one user associated with the mobile device; and using the mobile device identifier received from the television platform to transmit a message that includes the most relevant marketing information from the computing device to the mobile device identified by the mobile device identifier, such that the marketing information is displayable to the at least one user.

* * * * *